June 5, 1962

M. DE PAOLI 3,037,280

CUTTING HEAD FOR A DRY SHAVER HAVING
A RECIPROCATING CUTTER

Filed Jan. 10, 1957

INVENTOR
MARIANO DE PAOLI
BY Robert E. Burns
ATTORNEY

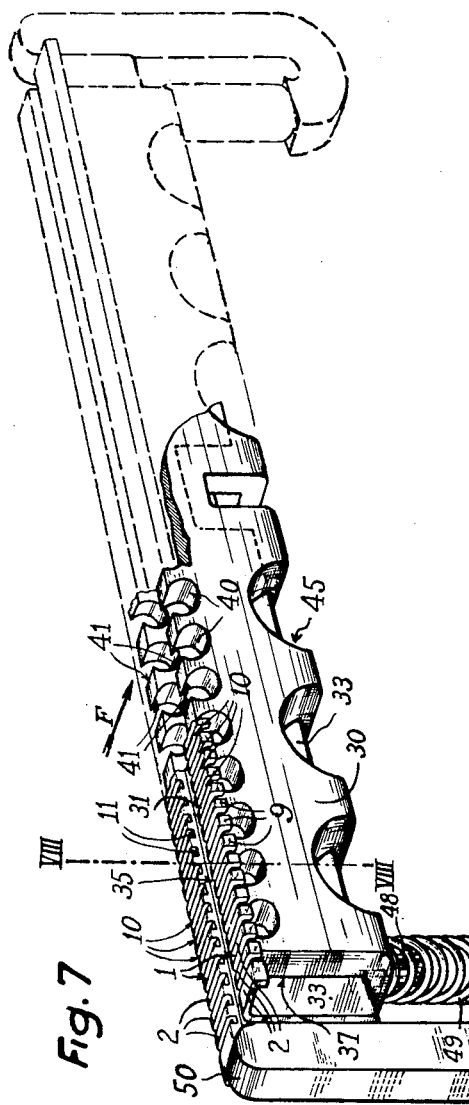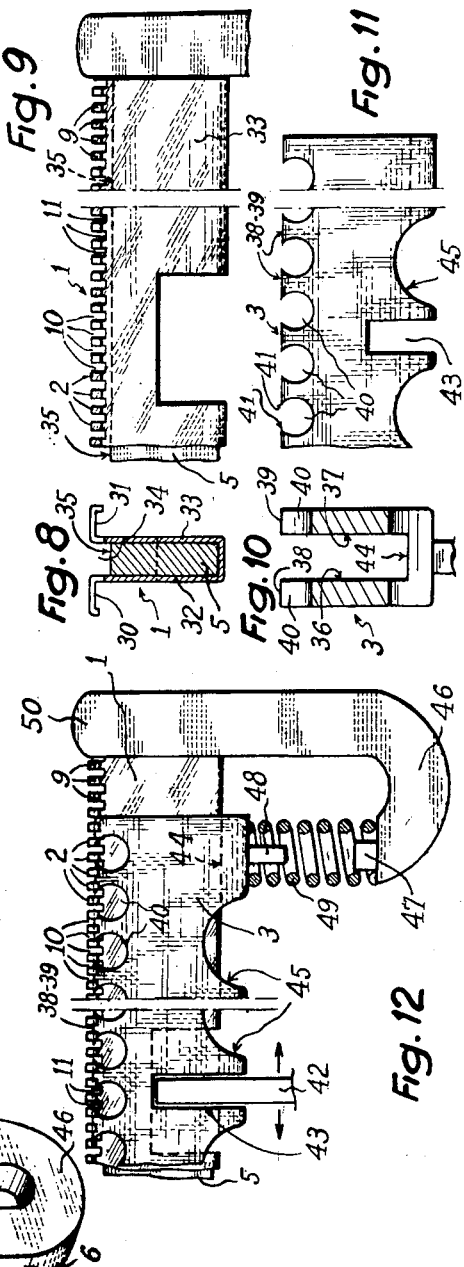

United States Patent Office 3,037,280
Patented June 5, 1962

3,037,280
CUTTING HEAD FOR A DRY SHAVER HAVING A RECIPROCATING CUTTER
Mariano de Paoli, 25 Rue Rebeval, Paris, France
Filed Jan. 10, 1957, Ser. No. 633,469
Claims priority, application France Nov. 30, 1956
3 Claims. (Cl. 30—43)

The present invention relates to an instrument for the dry cutting of hair, bristles, whiskers, etc. and relates more particularly to the cutting head of such an instrument. This cutting head comprises essentially a fixed comb and a movable comb actuated by a longitudinal reciprocating movement relatively to the fixed comb.

It is an object of the invention to provide a cutting head which permits a close shave to be obtained, comparable to that achieved by means of a blade.

It is a further object of the invention to provide a cutting head which can be efficiently utilized, not only for cutting side whiskers with a finish which is comparable to that obtained by means of a blade, but also for clipping moustaches, its function being similar to that of scissors.

It is a further object of the invention to provide a cutting head with teeth of very slight thickness but which are nevertheless non-deformable so as to make possible a clean cutting of the bristles near their base.

In order that the invention may be more fully understood, reference will now be made to the accompanying drawings, in which.

FIG. 7 shows a partial perspective view of a fourth embodiment of a cutting head, certain parts having been cut away, FIG. 8 shows the fixed comb of the cutting head of FIG. 7, in section along the line VIII—VIII of FIG. 7, FIG. 9 shows a partial elevational view of the fixed comb of FIG. 7, FIG. 10 shows the movable comb of FIG. 7, in section along the line VIII—VIII of FIG. 7, FIG. 11 is a partial elevational view of the movable comb of FIG. 7.

FIG. 12 is a partial elevation view of the cutting head of FIG. 7.

Figure 1:
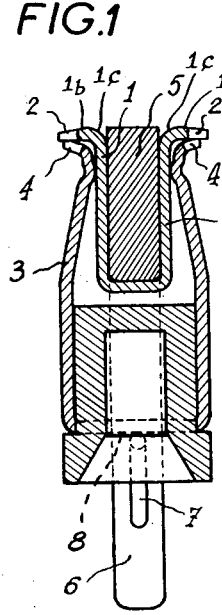
FIG. 1 shows in section one embodiment of a cutting head according to the invention, on a large scale.

On FIG. 1 is seen, in section, a channel shaped fixed comb 1 having a U-shaped body portion 1a and a pair of side edge portions or flanges 1b connected to the body portion along bend or fold lines 1c substantially at right angles with respect to the body portion. Each of these two edges, or side edge portions, carries a series of identical teeth 2 separated by notches or spaces 10, the dimensions of which are extremely small, that is to say, which are a low multiple of the average diameter of the hair or bristles to be cut. Beard bristles have diameters approaching 1 or 2 tenths of a millimeter. Under the term low multiple of the average diameter must be understood dimensions which are not higher than 5 or 6 times the average diameter, that is to say, dimensions which will be for the most part less than 1 millimeter. This is a very important characteristic because it was up until now thought necessary to give to the teeth and to the notches or spaces 10 between these teeth, dimensions which are much higher than those indicated above, in order to obtain a high efficiency.

In the embodiment of FIGS. 1 to 6, good results are obtained with teeth 2 roughly triangular in shape, the length and width of which are a few tenths of a millimeter for instance 3 or 4 tenths.

The movable comb 3 is situated under the fixed comb and said movable comb is also generally of U-shape and surrounds the first channel and its longitudinal edges are also bent back and carry teeth 4.

Whereas the fixed comb is secured to the case of the instrument, the movable comb 3 is connected to any type of motor which can impart a longitudinal reciprocating movement to it.

The combs 1 and 3 are made of sheet steel of one tenth of a millimeter or several tenths of a millimeter in thickness. At the cutting edges this thickness is reduced by the truing effected on the contact surfaces of the two combs and also on the upper surface of the teeth of the fixed comb 1, the thickness of these teeth 2 is reduced to six hundreths of a millimeter.

The particular bent back shape of the combs in the vicinity of their cutting edges confers to the two combs, in spite of their small thickness, the rigidity which is essential for the good operation of a shaver of this type.

The rigidity thus created is present throughout the entirety of each of the teeth 2 or 4 because these teeth have a relatively wide base, and more particularly, because their length is much reduced.

A steel part 5 placed between the two upright sides of the fixed comb 1 increases still further the rigidity of the whole instrument. This part serves to interlock the whole head with the case of the instrument by means of two tongues 6 which are forcibly located in two grooves of the case (not shown in the drawings). This securing arrangement being well-known, it will not be described in detail. Each tongue 6 has a spring 7 which presses on the bottom 8 of the movable comb 3. The spring 7, serves to apply the teeth 4 of the movable comb 3 against the lower face of the teeth 2 of the fixed comb 1.

Figure 2:
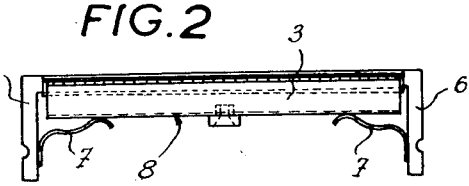
FIG. 2 shows an elevational view of the cutting head of FIG. 1.

The assembly thus produced, which is shown in FIG. 2, forms a completely independent cutting head.

It is essential that the pressure of the mobile comb against the fixed comb be sufficiently great. A drawback which frequently occurs in known shavers is that when the movable comb meets a great resistance to cutting it becomes disengaged from the fixed comb.

With a cutting head according to the invention it is possible to apply sufficient pressure because the contact surfaces of the two combs are much reduced. Moreover the machining of a cutting head according to the invention is very greatly facilitated because of the smallness of the teeth.

Figure 3:
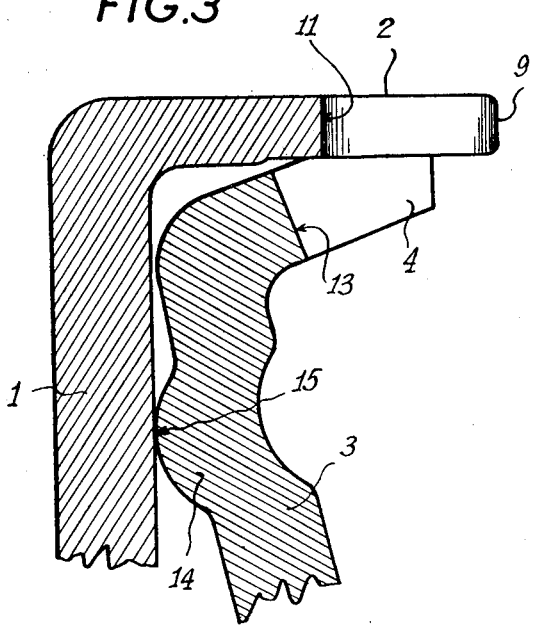
FIG. 3 is an enlarged view of both the fixed and movable combs of FIG. 1.

In FIG. 3, which is a sectional view on a very large scale of the cutting edges, the teeth 2 and their rounded off end 9 are shown. These teeth 2 are separated by notches 10 which are substantially triangular in shape and the deepest end of which is represented at 11. Similarly the teeth 4 are seperated by notches 12 having a bottom 13.

The teeth 4 have also been made thinner and trued so as to permit them to slide with as little friction as possible against the lower surface of the teeth 2 which have also been trued. This truing of the teeth 4 also improves their cutting edge.

In order to prevent a portion of the energy being lost by friction between the teeth, the longitudinal guiding of the movable comb 3, relative to the fixed comb 1, is ensured by means of a number of small spherical embossments such as shown at 14 which reduce the contact between the two mountings of the combs to a number of points such as shown at 15.

Figure 4:
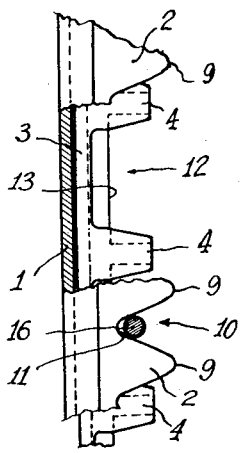
FIG. 4 is a top view of the combs with parts cut away.

In FIG. 4 is shown in section a number of hairs or bristles 16 which have penetrated in the notches 10 separating the teeth 2 from the fixed comb. The penetration of these hairs or bristles is effected easily because of the shape of the notches and teeth.

It can be seen that, on account of the smallness of these notches and their substantially trianguler shape, a hair of bristle 16 is squeezed between the two sides of a notch 10 as well as between the edges of the shears and because of this the cutting of the hair of bristle by the teeth 4 is facilitated.

In contrast to this, with shavers of known types the width of the notches between the teeth is such that the hair or bristle 16 can move within this width under the thrust of the teeth 4 and this causes a sort of tearing out of the hairs or bristle. Furthermore, it may happen that a number of hairs or bristles will bend and will not be cut.

The teeth 4 seen from above have a rectangular shape and their pitch is a low multiple of that of the teeth 2, for instance double that of the teeth 2.

One of the advantages of the cutting head according to the invention is that it permits the clipping of the side-whiskers and moustaches. Although for the cutting of beard bristles the apparatus is disposed perpendicularly to the surface to be shaved so that the bent back edges 2 of the fixed comb will be placed on that surface, it is possible by placing the teeth 2 perpendicularly to the surface of the side-whiskers to cut these as with a blade. Similarly, it is possible to clip the moustache as with scissors.

In any case the epidermis is protected from the movement of the teeth 4 by the fixed teeth 2 which move forward relatively to the others.

Figure 5:
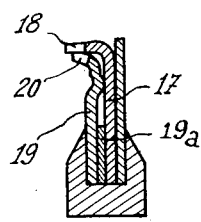
FIG. 5 is a sectional view of a second embodiment according to the invention.

It is possible without departing from the scope of the invention to provide each of the two combs with only one cutting edge as is shown in FIG. 5.

The fixed comb 17 is always bent back in the vicinity of its cutting edge so as to permit the teeth 18 to be rigid although having a small thickness. This also applies to the movable comb 19 the teeth 20 of which are situated in contact with the lower face of the fixed teeth 18, the teeth 18 and 20 having, as in the preceding example, dimensions which are a low multiple of the diameter of the hairs or bristles to be cut. The body portions of the fixed comb 17 and the movable comb 20 have a spacer 19a between them.

It is also possible to give to these combs various shapes which are suitable for special practical applications.

Figure 6:
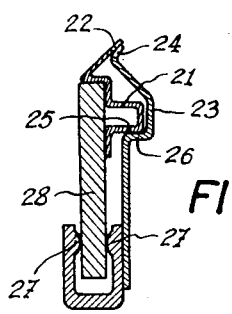
FIG. 6 is a sectional view of a third embodiment according to the invention.

For instance, it is possible according to the invention, to produce a shaver-clippers, as shown in FIG. 6, making possible easy shaving of the nape of the neck.

The fixed comb 21, which is intended to come into contact with the epidermis carries teeth 22 identical to those described above.

Against its lower face the movable comb 23, carrying teeth 24 which are similar to teeth 22, moves with an alternating movement.

The two cutting edges are rigidified by the curvature given to the combs in the vicinity of these edges.

The parts of the two teeth which are in contact are in this case also trued. The combs 21 and 23 have as contact surfaces, apart from the teeth, the shoulders 25 and 26 and the points of contact between the lugs 27 carried by the movable comb and situated on either side of a reinforcement part 28 which is integral with the fixed comb 21.

The advantages of the cutting head of these clippers are the same as those which have been mentioned and which result from the characteristics of the invention. For cutting head hairs it is merely necessary to provide wider slits having dimensions of the size of the small bundles which make up the head hair.

The improved cutting head according to the invention, shown in FIGS. 7 to 12, comprises a fixed comb 1 and a movable comb 3. The fixed comb 1 is formed by a thin steel sheet having a thickness of one or more tenths of a millimeter which has been shaped to have a channel-shaped section. The edges 30 and 31 of the steel sheet are bent back outwardly approximately at a right angle relatively to the parallel parts 32 and 33 which make up the walls of the throat 34. The teeth 2 of the fixed comb are cut in these edges 30 and 31 the width of which is of the order of 1 mm.

According to the invention the ends 9 of the teeth 2 are bent back downwardly (that is to say towards the bottom of the throat) for a distance which is just sufficient that, when the edges 30 and 31 are in contact with the epidermis to be shaved, said epidermis will not be injured by the fine ends of the teeth 2. The height of the parts 9 which are bent over downwardly is preferably a few tenths of a millimeter. It is desirable that this height be not too great so that the parts 9 do not prevent the long hair or bristles from penetrating into the notches 10 situated between the teeth 2; it has already been said that the rigidity of the teeth 2 of the fixed comb 1 was ensured by the channel shape given to this comb as well as by the presence of a steel part 5 located in the throat 34 and in contact with the parts 32 and 33 of the fixed comb 1 to which it is secured.

This part 5 has a height which is such that its upper surface 35 is set back relatively to the outer surfaces of the edges 30 and 31. At the same time the notches 10 situated between the teeth 2 are extended along a certain height of the parts 32 or 33 which is substantially equal to the height of the parts 9 (that is to say a few tenths of a millimeter) and in such manner that the bottoms 11 of these notches will be above the previously mentioned surface 35. Thus if we assume that the cutting head moves on the epidermis in the direction of the arrow F, the hairs or bristles which might have missed being cut by the teeth of the edge 31 penetrate into the part of the throat 34 situated above the surface 35 and from there can penetrate into the notches situated between the teeth of the edge 30 of the fixed comb 1 in order to be cut.

In this manner the cutting capacity of the shaving head has been doubled.

The comb 3 is formed by a steel sheet shaped to have a channel shaped section, the parts 36 and 37 of said comb moving along the parts 32 and 33 of the fixed comb with a reciprocating movement.

In the assembly described the rigidity of this movable comb 3 is ensured by giving, to the steel sheet which forms it, a thickness which is substantially greater than that of the sheet forming the fixed comb, for instance of the order of from 5 to 10 tenths of a millimeter, the faces of the upper edges 38 and 39 of comb 3 sliding while remaining in contact with the lower surfaces of the teeth 2.

According to the invention the teeth of this mobile comb are produced in the following manner: In each of the parts 36 and 37, in the vicinity of the longitudinal edges, a series of perforations 40 are made in such manner that their portions which are nearest to the upper edges have a slight angle in relation to the planes of said upper edges: in the embodiment described these perforations are circular. The truing of the faces of the edges is then effected in such manner that the perforations 40 are opened thus creating ridges such as at 41 which define the cutting edges of the teeth 4 of the mobile comb 3.

This movable comb is driven with a reciprocating movement by means of a lug 42 actuated in this manner by any suitable means (vibrating motor, electric motor, manual means or other means). If the motor actuating this lug is an electric motor, this lug will be electrically insulated to prevent the electric current from penetrating into the cutting head and said lug is located in a central hollow 43 of the movable comb extending on the lateral parts 36 and 37 as well as on the bottom 44.

These lateral parts 36 and 37 and this bottom 44 have other apertures 45 which make the bending of the movable comb 3 easier and which enable tempering deformations to be avoided.

The movable comb is applied against the fixed comb in the direction of the height of the head by the thrust in this direction of springs pressing against downward extensions of the fixed comb and exerting their pressure on the bottom of the movable comb.

In this embodiment, the device for applying the edges 38 and 39 of the movable comb against the lower surfaces of the teeth 2 of the fixed comb 1 is constructed as follows:

The steel part 5 has at each of its longitudinal ends a tongue 6 extending in the vertical direction and said tongue has at its lower end a projection 46 extending inwardly in the longitudinal direction of the part 5 and carrying a finger 47 directed towards the top.

Two small tongues 48 cut out of the bottom 44 of the movable comb are bent back at right angles, these small tongues being disposed on the movable comb so as to be substantially facing the two fingers 47 when the movable comb is placed on the fixed comb in its position of rest. A helical spring 49 is inserted between each pair of elements 47 and 48 the end turns of each of these springs being wound respectively around said elements 47 and 48.

According to the improved device which has been described above, the movable comb is applied with pressure against the fixed comb without creating friction between these combs which would absorb a part of the energy derived from the motor.

Moreover, as can be seen from the figures, the part 5 has at each of its ends two bulges 50 extending upwardly so as to reach above the edges 30 and 31, the surfaces of these bulging parts having no ridge. These bulges enable the avoidance of any contact between the epidermis and the longitudinal ends of the edges 30 and 31.

I claim:
1. A cutting head for a dry shaver effective both for cutting whiskers and for trimming moustaches and the like, said head comprising, in combination, means defining a fixed comb, means defining a movable comb adjacent said fixed comb and adapted to undergo a longitudinal reciprocating movement relatively to said fixed comb, said means defining said fixed comb comprising a thin metal sheet having a U-shaped body portion defining a U-shaped cavity and two side edge portions connected to said body portion along parallel fold lines at a substantially right angle with respect to the body portion to define two parallel narrow flanges each having a free end, said flanges being provided with a plurality of notches extending inwardly toward said fold lines from the free end of each flange to define a plurality of free-ended parallel teeth interconnected only at their inner ends, said notches having dimensions which are a low multiple of the average diameter of the hair to be cut, said means defining said movable comb comprising a metal sheet and including a U-shaped body portion overlying the body portion of the fixed comb and said movable comb having teeth with end faces defining end cutting edges positioned to slide on the lower face of the teeth of the fixed comb upon reciprocating movement of said movable comb, with said teeth of the movable comb extending substantially at right angles to said notches in said fixed comb across which said end faces slide upon said reciprocation, and means in said U-shaped cavity to rigidify said body portion and thereby rigidify the teeth of the fixed comb, said last-named means comprising an elongated rigid bar extending continuously longitudinally in said cavity and in contact with the walls of said U-shaped body portion adjacent said bar.

2. A cutting head as defined in claim 1, wherein the teeth of the fixed comb are directed backwardly at their outer free ends with respect to said body portion.

3. A cutting head as defined in claim 1, wherein the teeth of the fixed comb are directed backwardly at their outer free ends with respect to said body portion, and wherein the notches between the teeth of the fixed comb extend into the body portion of the metal sheet.

References Cited in the file of this patent

UNITED STATES PATENTS

| | | |
|---|---|---|
| 2,091,338 | Segal | Aug. 31, 1937 |
| 2,105,775 | Nilson | Jan. 18, 1938 |
| 2,111,703 | Strzelecki | Mar. 22, 1938 |
| 2,143,896 | Nyhagen | Jan. 17, 1939 |
| 2,171,888 | O'Connor | Sept. 5, 1939 |
| 2,210,466 | Randolph et al. | Aug. 6, 1940 |
| 2,243,196 | Dalkowitz | May 27, 1941 |
| 2,272,081 | Bodkin et al. | Feb. 3, 1942 |
| 2,289,875 | Dalkowitz | July 14, 1942 |
| 2,296,094 | Dalkowitz | Sept. 15, 1942 |
| 2,326,192 | Andis et al. | Aug. 10, 1943 |
| 2,539,011 | Denocenzo | Jan. 23, 1951 |
| 2,734,265 | Akerib | Feb. 14, 1956 |
| 2,734,266 | Schreyer | Feb. 14, 1956 |
| 2,859,513 | Bylund | Nov. 11, 1958 |

FOREIGN PATENTS

| | | |
|---|---|---|
| 684,916 | Germany | Dec. 7, 1939 |
| 817,852 | Germany | Oct. 22, 1951 |
| 719,005 | Great Britain | Nov. 24, 1954 |